July 6, 1965

W. H. PETTIT 3,193,306

CULTIVATOR HITCH

Filed July 2, 1963

2 Sheets-Sheet 1

INVENTOR
WILLIAM H. PETITT

BY *Semmes and Semmes*

ATTORNEYS

July 6, 1965  W. H. PETTIT  3,193,306
CULTIVATOR HITCH

Filed July 2, 1963  2 Sheets-Sheet 2

INVENTOR
WILLIAM H. PETITT

BY *Semmes and Semmes*

ATTORNEYS 3,193,306
CULTIVATOR HITCH
William H. Pettit, Chattanooga, Tenn., assignor to The Harriman Manufacturing Company, Chattanooga, Tenn., a corporation of Tennessee
Filed July 2, 1963, Ser. No. 292,360
1 Claim. (Cl. 280—489)

The present application relates to spring loaded hitches of the type used for securing agricultural tools to a tractor.

In the hitching of ground-engaging agricultural implements to a tractor various previous inventors have devised means for enhancing the rigidity of the hitch as well as facilitating the pivoting of the ground-engaging implements about the hitch, as it is desired to float the implements over obstructions upon the ground or to raise the implements from the ground. A principal shortcoming of conventional hitches has been the rigidity of suspension of the agricultural implements either in the ground-engaging or raised positions. Also, in those hitches which have provided a measure of pivotability there has not been devised an efficient means for either damping the pivotability of the implements so that they uniformly engage the ground or snubbing the implements against over-travel as the discs drop over rocks, or pot holes and other light obstructions. According to the present invention, a pair of axially aligned compression springs are interposed between a pivoted central hitch point and a rigid portion of the agricultural implement frame. Pivoted outboard hitches are also provided. The spring of greater compressibility acts as a damper to instill uniform engagement of the implements within the ground. The spring of lesser compressibility acts as the snubber, preventing the ground-engaging implements from jamming into the ground as they drop over obstruction. Both compressible springs are available to keep the discs from bouncing up and down as the implements are raised from the ground and transported. The upward pivotability of the outboard hitches is limited to the extent that they lock and assist in lifting of the implements off of the ground for transport.

Accordingly, it is an object of invention to provide a spring-loaded hitch construction.

Another object of invention is to provide a spring-loaded hitch for cultivators in which may be imparted both damping and snubbing of the ground-engaging implements.

Another object of invention is to provide in a three point hitch adjusting means for varying the degree of damping the cut of the ground-engaging elements, as well as snubbing the elements against override.

Figure 1:
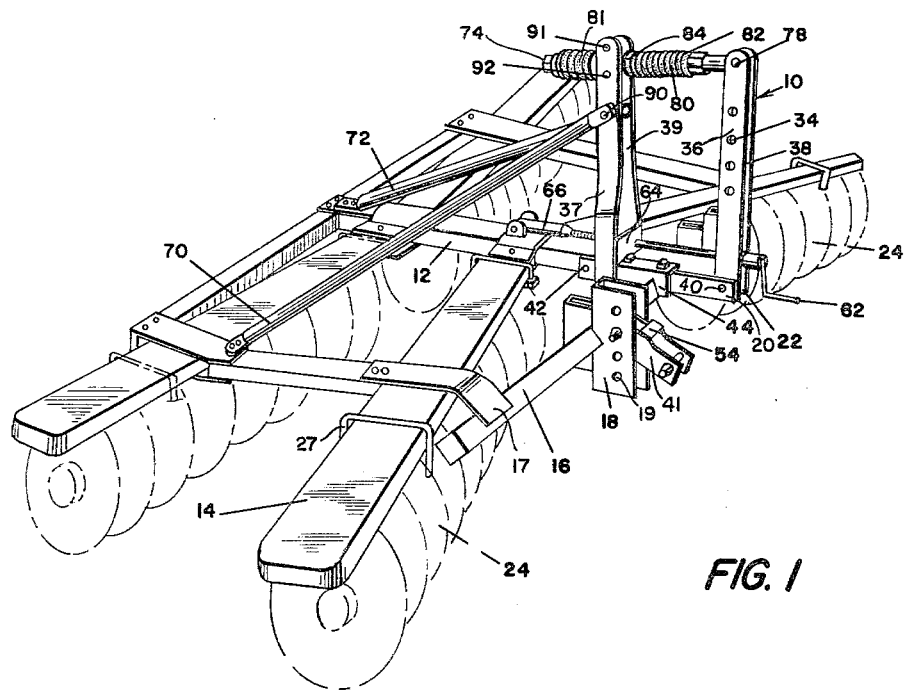
Figure 2:
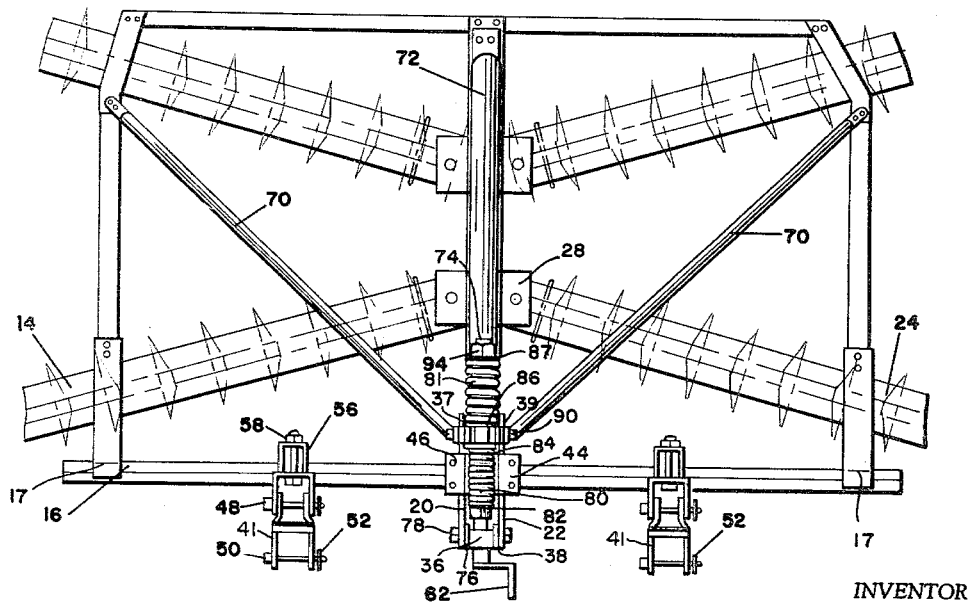
Figure 3:
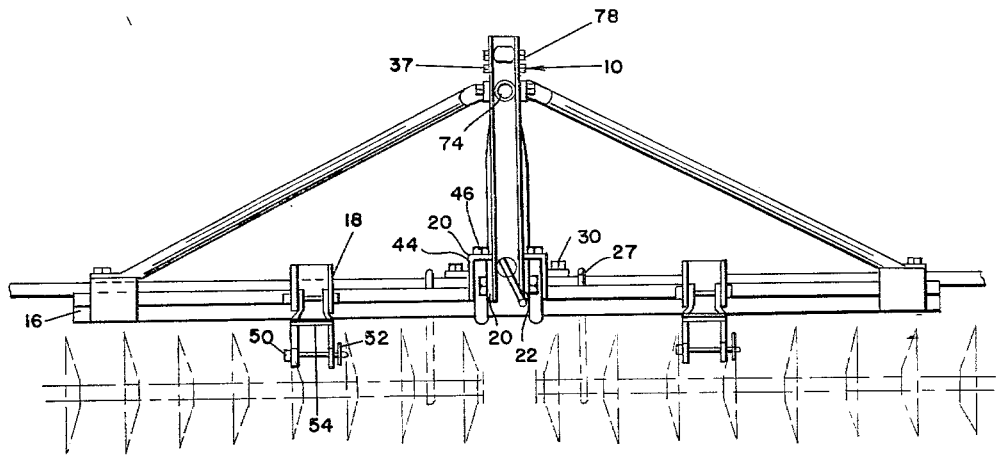
Figure 4:
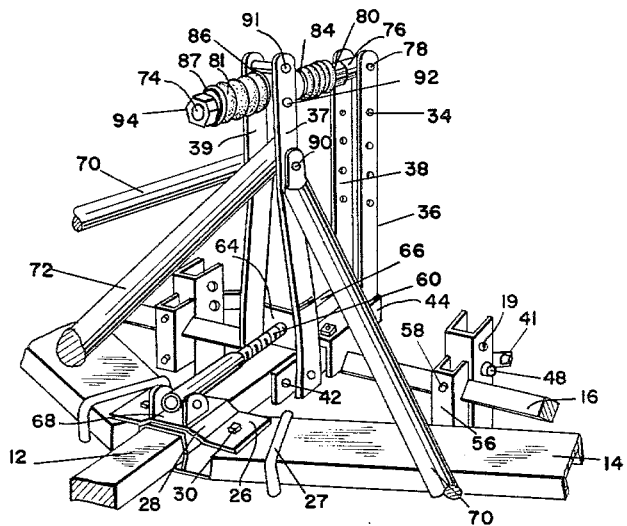

Yet additional objects of invention will become apparent from the ensuing specification and attached drawings wherein:

FIG. 1 is a perspective view of the hitch mounted upon a disc harrow frame,
FIG. 2 is a top plan,
FIG. 3 is a front elevation, and
FIG. 4 is a rear perspective view.

In FIG. 1 the hitch is shown as comprising a parallelogram generally designated as 10 and attached by bolts extending through its rigid base members 20 and 22 to the agricultural implement frame 12. The individual harrow support arms 14 are pivoted to frame 12 by means of encompassing brackets 28 having outward flanges 26 through which bolts 30 may traverse. The individual harrow discs 24 are mounted upon a conventional axle which is secured by plate means and U bolt members 27 upon the support arms 14. Front tool bar 16 hits outboard guides 17 which limit the pivotability of support arms 14. Tool bar 16 is secured to base members 20 and 22 by means of clamps 44 through which U bolts 46 extend.

Pivoted front vertical members 36 and 38 are pivotally secured to base members 20 and 22 by means of bolt 40 and have vertical adjusting holes 34 which may be attached to one of the three tractor-mounted rigid hitch points. Front vertical members 38 and 36 thus serve as the pivoted central hitch point. The pivotable outboard hitches 18 are attached to tool bar 16 by means of bracket 56 and U bolt 58. Outboard hitches 18 have adjusting holes 19 and a strap 41 pivoted by pin 48 and attachable to the tractor-mounted rigid outboard hitch point by means of pin 50. Limit bar 54 bottoms against hitch 18 so that when upward pivoting reaches a certain degree the entire agricultural assembly may be lifted from the ground. Cotter pins 52 may be employed to secure pins 48 and 50 in outboard hitches 18. A threaded bolt 60 may be supported within plate 64 attached to the rigid rear vertical members 37 and 39. Bolt 60 may have hand crank 62 and extend through plate 64 into base 66 which is pivoted in bracket 68 attached to clamp 28. By turning of threaded bolt 60 the angle of pivotability of supporting arms 14 may be varied at will. Outboard struts 70 extend from bolt 90 at a median point of rear vertical members 37 and 39 to the rear support arms 14. A central strut 72 runs from this bolt 90 to a rigid portion of frame 12. By securing these struts below the rear vertical pivot point, additional leverage is provided when lifting the entire assembly from the ground for transport. A top shaft 74 comprises the top of the parallelogram and extends from cap 76, pivoted between the front vertical members by bolt 78, between rear members 37 and 39 in which it is vertically secured by bolts 91 and 92. Washers 82, 84, 86 and 87 may be employed to light damper spring 80 and heavier snubber spring 81 with respect to each other and with respect to the vertical members 36, 38, 37 and 39. Nuts 94 may be employed for individually tightening and adjusting either spring so as to vary compressibility.

In operation springs 80 and 81 work against each other to compensate for displacement of frame 12 and to return the frame and thus the ground engaging discs 24 or other agricultural implements to their preset positions. The spring tensions may be individually adjusted for individual applications. Front damper spring 80 is adjustable to keep discs 24 engaging the ground at proper depth, yet allowing discs 24 to rise over a stone or other obstruction. Rear snubber spring 81 acts as a snubber to keep discs 24 from jaming back into the ground by preventing over-travel, as the discs drop over the obstruction and return to re-engage the ground.

When the discs 24 are raised from the ground and the agricultural implements are supported for transport snubber spring 81 prevents the individual disc gangs from bouncing up and down and absorbs shock of the downward thrust, thus relieving strain on the three hitch points. Again, front damper spring 80 acts as a damper during such action. Outboard hitches 18 pivot as the frame flexes about the central hitch point due to discs 24 hitting uneven ground or obstacles. However limit bars 54 on hitches 18 limit vertical pivotability. Thus when the entire assembly is lifted from the ground limit bars 54 bottom on the hitches 18, providing rigid pick up points.

Inasmuch as the center hitch comprises basically a parallelogram, with the bottom horizontal members 20 and 22 firmly clamped to the tool frame 12, the top horizontal member 74 and front vertical member pivot. Holes 34 in the central hitch as well as in the outboard hitches 18 provide various settings for depth of cut.

Manifestly, various changes in structure may be employed without departing from the scope of invention as defined in the subjoined claim.

I claim:

A cultivator hitch of the type attachable to an agricultural implement frame comprising:
- (A) a rigid base secured to a forward portion of said frame;
- (B) a front vertical member pivoted at its lower end upon said base;
- (C) a rear vertical member parallel to said front member and attached at its lower end to said base so as to form an integral part thereof;
- (D) strut means interconnecting a median portion of said rear vertical member and a rigid, near portion of said frame; and
- (E) a top compressible member interconnecting the free ends of said front and rear vertical members, said compressible member further including:
  - (i) a top shaft pivoted at one end to said front vertical member top, contacting and extending rearwardly of said rear vertical member,
  - (ii) a spring of greater compressibility supported upon said shaft between said front and rear vertical members, and
  - (iii) a spring of lesser compressibility supported upon said shaft intermediate said rear vertical member and a shaft rear end retaining means.

References Cited by the Examiner

UNITED STATES PATENTS

| | | | |
|---|---|---|---|
| 2,919,754 | 1/60 | Walberg | 172—7 |
| 2,955,664 | 10/60 | Oehler et al. | 172—448 X |

FOREIGN PATENTS

| | | |
|---|---|---|
| 1,279,327 | 11/61 | France. |
| 599,245 | 3/48 | Great Britain. |
| 609,908 | 10/48 | Great Britain. |

BENJAMIN HERSH, *Primary Examiner.*

A. HARRY LEVY, *Examiner.*